(12) United States Patent
Hayashida

(10) Patent No.: US 8,838,952 B2
(45) Date of Patent: Sep. 16, 2014

(54) INFORMATION PROCESSING APPARATUS WITH SECURE BOOT CAPABILITY CAPABLE OF VERIFICATION OF CONFIGURATION CHANGE

(75) Inventor: Akira Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 13/238,744

(22) Filed: Sep. 21, 2011

(65) Prior Publication Data

US 2012/0011353 A1    Jan. 12, 2012

Related U.S. Application Data

(63) Continuation of application No. PCT/JP2009/056710, filed on Mar. 31, 2009.

(51) Int. Cl.
| | |
|---|---|
| *G06F 1/24* | (2006.01) |
| *G06F 9/00* | (2006.01) |
| *H04L 29/06* | (2006.01) |
| *G06F 15/177* | (2006.01) |
| *G06F 21/57* | (2013.01) |

(52) U.S. Cl.
CPC .................................... *G06F 21/57* (2013.01)
USPC ............................ 713/100; 713/164; 709/220

(58) Field of Classification Search
CPC ............................. G06F 9/4411; G06F 21/57
USPC .................................. 713/100, 164; 709/220
See application file for complete search history.

(56) References Cited

U.S. PATENT DOCUMENTS 7,366,898 B2 * 4/2008 Evans et al. .................. 713/160

8,214,880 B1 * 7/2012 Wu .................................. 726/3
2005/0033948 A1   2/2005 Wei (Continued)

FOREIGN PATENT DOCUMENTS

| EP | 1 182 545 A2 | 2/2002 |
|---|---|---|
| JP | 2002-63037 | 2/2002 |

(Continued)

OTHER PUBLICATIONS

International Search Report for PCT/JP2009/056710, mailed Jun. 16, 2010.

*Primary Examiner* — Thomas Lee
*Assistant Examiner* — Robert Cassity
(74) *Attorney, Agent, or Firm* — Staas & Halsey LLP

(57) ABSTRACT

An information processing apparatus having a verification capability of a configuration change. The information processing apparatus includes: a configuration storage unit to store information on components having been connected to the information processing apparatus as reference configuration information; a detecting unit to detect configuration information on components being connected to the information processing apparatus in booting; a comparing unit to compare, detected configuration information and the reference configuration information when the information processing apparatus is booted; a boot control unit to terminate booting of the information processing apparatus when an unequal comparison occurs; a monitoring unit to monitor, after the information processing apparatus is booted, a configuration change of the information processing apparatus in operation; and a dynamic update unit to update, when the configuration change of the information processing apparatus in operation is recognized, the reference configuration information with configuration information of the configuration-changed information processing apparatus.

4 Claims, 5 Drawing Sheets

(56) References Cited

U.S. PATENT DOCUMENTS

| | | | |
|---|---|---|---|
| 2005/0262225 A1* | 11/2005 | Halpern et al. | 709/220 |
| 2006/0064752 A1 | 3/2006 | Wang et al. | |
| 2006/0155988 A1 | 7/2006 | Hunter et al. | |
| 2006/0179302 A1* | 8/2006 | Hatakeyama | 713/164 |
| 2007/0067617 A1 | 3/2007 | Tarkkala | |
| 2007/0226518 A1 | 9/2007 | Yasaki et al. | |
| 2008/0097626 A1* | 4/2008 | Reed et al. | 700/30 |
| 2009/0013406 A1 | 1/2009 | Cabuk et al. | |
| 2009/0150525 A1* | 6/2009 | Edgett et al. | 709/220 |
| 2009/0287904 A1* | 11/2009 | Bybell et al. | 711/216 |

FOREIGN PATENT DOCUMENTS

| | | |
|---|---|---|
| JP | 2005-56404 | 3/2005 |
| JP | 2006-92533 | 4/2006 |
| JP | 2006-323814 | 11/2006 |
| JP | 2007-257197 | 10/2007 |
| JP | 2009-15818 | 1/2009 |
| JP | 2009-20748 | 1/2009 |
| JP | 2009-509373 | 3/2009 |

* cited by examiner

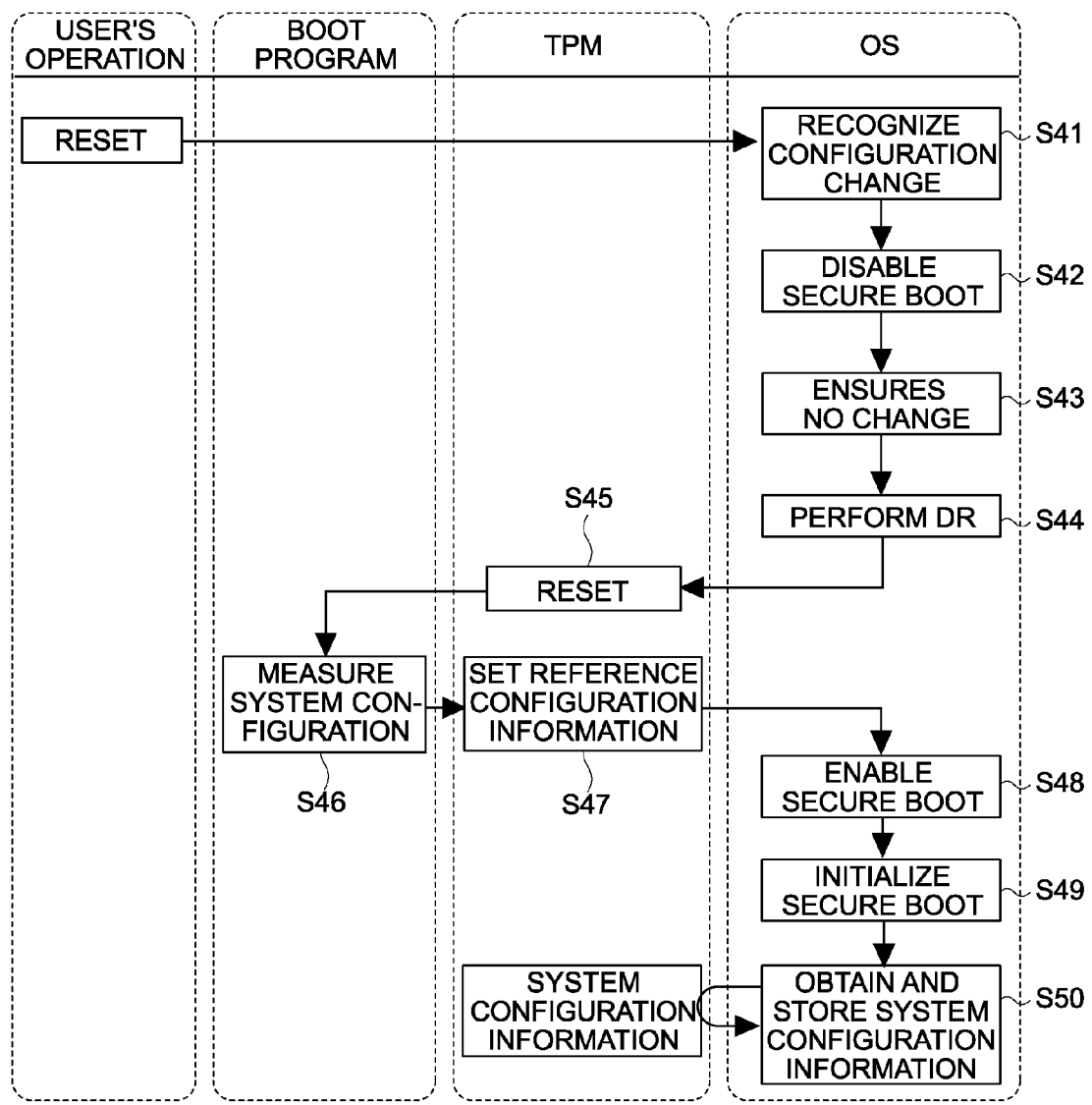

ered in the TPM.
INFORMATION PROCESSING APPARATUS WITH SECURE BOOT CAPABILITY CAPABLE OF VERIFICATION OF CONFIGURATION CHANGE

CROSS-REFERENCE TO RELATED APPLICATIONS

This application is a continuation application of International Application PCT/JP2009/056710/filed on Mar. 31, 2009 and designated the U.S., the entire contents of which are incorporated herein by reference.

FIELD

The present technology relates to a technology for verifying a configuration change of an information processing apparatus.

BACKGROUND

As security threats to an information processing apparatus, computer viruses and attacks over the network are widely known, however, it is possible to make a physical attack by adding to the information processing apparatus a device that can be a backdoor security hole.

For instance, even if an operation policy is settled in which permission of a manager is required to connect a communication unit or an input-output device to the information processing apparatus in order to prevent the information leakage, there is a case where a user connects an input-output device to the apparatus without permission.

Accordingly, developed is an information processing apparatus that stores configuration information of the information processing apparatus into a tamper-resistant chip named TPM (Trusted Platform Module), collects configuration information when being booted, and verifies whether or not configuration is changed by collating the collected information with the information in the TPM.

Note that, for example, technologies disclosed in the following patent documents are given by way of the prior arts related to the invention of the present application.

[Patent document 1] Japanese Laid-Open Patent Publication No. 2006-092533

[Patent document 2] Japanese Laid-Open Patent Publication No. 2006-323814

[Patent document 3] Japanese Laid-Open Patent Publication No. 2002-063037

The conventional information processing apparatus that verifies configuration change when being booted has such a problem that, even when configuration change is made properly, configuration change is detected and thereby the boot process is terminated.

Therefore, it is possible to disable the verification capability of the configuration change when a proper configuration change is being made and to enable, after the apparatus is rebooted, the verification capability of the configuration change.

However, when the verification capability is disabled in a case where the configuration of the information processing apparatus in operation is changed with using DR (Dynamic Reconfiguration) that allows a user (manager) to add or delete devices dynamically, which results in a problem where security cannot be guaranteed until the next rebooting will be executed. Moreover, the user may forget to enable the verification capability.

SUMMARY

According to an aspect of the invention, an information processing apparatus includes: a configuration storage unit to store information on components having been connected to the information processing apparatus as reference configuration information; a detecting unit to detect configuration information on components being connected to the information processing apparatus in booting; a comparing unit to compare, detected configuration information and the reference configuration information when the information processing apparatus is booted; a boot control unit to terminate booting of the information processing apparatus when an unequal comparison between the detected configuration information and the reference configuration information occurs; a monitoring unit to monitor, after the information processing apparatus is booted, a configuration change of the information processing apparatus that is in operation; and a dynamic update unit to update, when the configuration change of the information processing apparatus in operation is recognized by the monitoring unit, the reference configuration information with configuration information of the information processing apparatus the configuration of which has been changed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is an explanatory diagram of a control method in a case where a configuration of the apparatus in operation is changed.

DESCRIPTION OF EMBODIMENT

Figure 1:
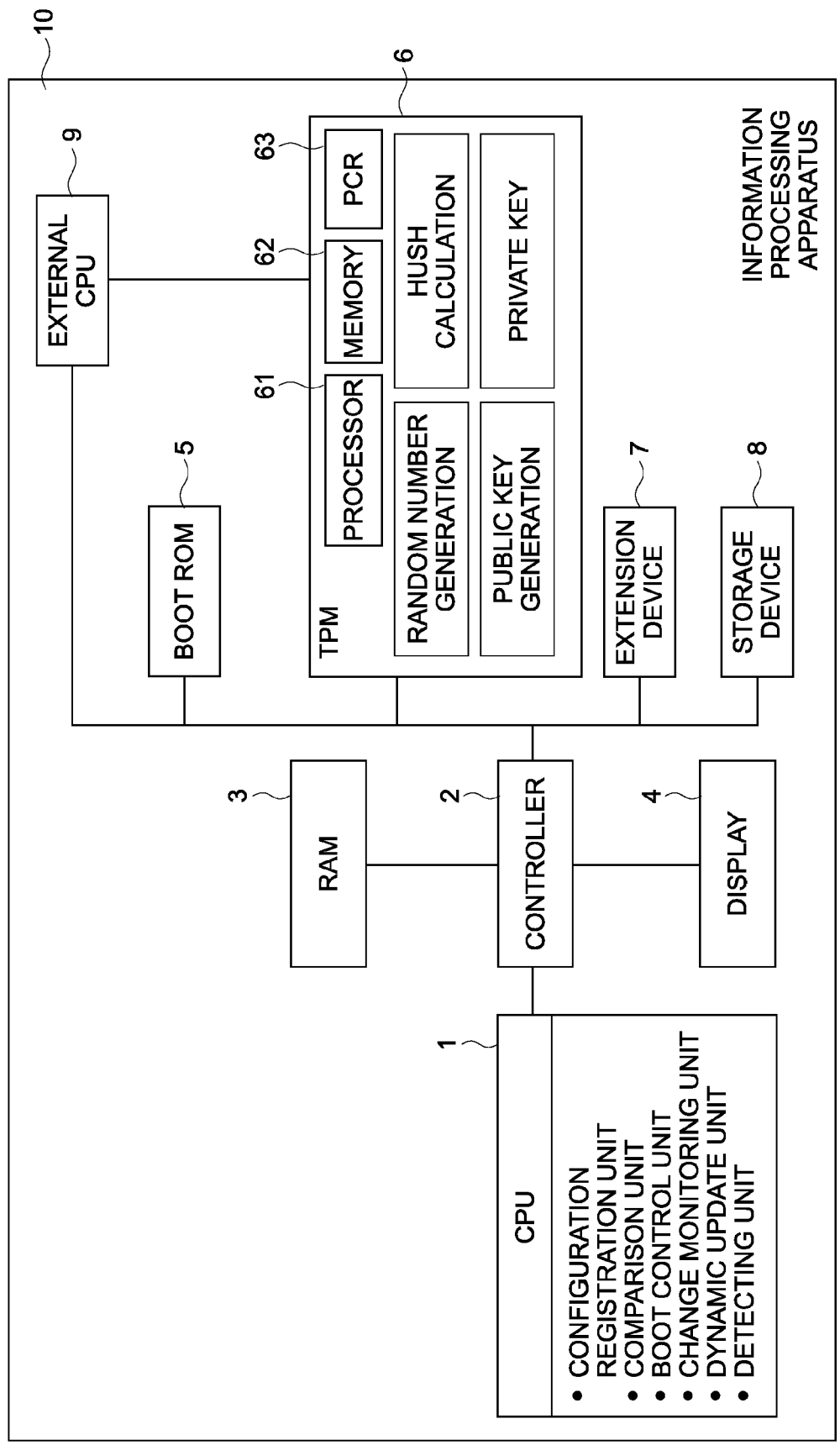
FIG. 1 is a schematic diagram of an information processing apparatus.

FIG. 1 is a schematic diagram of an information processing apparatus that has a capability of verifying a configuration change. The information processing apparatus 10 in FIG. 1 is provided with a CPU (Central Processing Unit) 1, a controller 2, a RAM (Random Access Memory) 3, a display 4, a boot ROM (Read Only Memory) 5, a TPM 6, an extension device 7, and a storage device 8.

The RAM 3 is a main memory that is readable and writable by the CPU 1. The display 4 displays information such as processing results of the CPU 1, etc.

The boot ROM 5 stores a boot loader to start the information processing apparatus, a BIOS (Basic Input/Output System), etc.

The controller 2 controls each of the devices 3-8 on the basis of commands output by processing of the CPU 1. For instance, the controller 2 generates a video signal on the basis of display commands from the CPU 1 and makes the display 4 display images. Moreover, the controller 2 controls reading/ writing of information from/to the RAM 3, the boot ROM 5 and the storage device 8 on the basis of commands from the CPU 1.

The TPM 6 is a semiconductor chip based on the specification settled on by the group named Trusted Computing Group and provides security-related capability. The TPM 6 is provided with a processor 61, a memory 62 and a PCR (Platform Configuration Register) 63 and is capable of performing random number generation, hush calculation, public key generation and private key generation. The processor 61 makes the PCR 63 serving as the configuration storage unit store configuration information. When the processor 61 writes a value into the PCR 63, a hash of the concatenation of the current value in the PCR 63 and the new value is stored in the PCR 63. Namely, the value in the PCR 63 is difficult to be altered dishonestly into a specific value, since it is a hashed value of the values written in the past. Moreover, since original data is intentionally lost in the hushing process, the value in the PCR 63 cannot be converted into the preceding value.

An external CPU 9 sends the TPM 6 a reset signal in response to a reset request by the CPU 1 while the information processing apparatus 10 is in operation, thereby resetting the TPM 6. The external CPU 9 may be a semiconductor chip including a simple processor for performing reception of the reset request and transmission of the reset signal, and it also may be a general-purpose information processing apparatus that performs reception of the reset request and transmission of the reset signal.

The extension device 7 is a device, such as a communication control unit, an input-output device, an external storage device, etc., that is attachable/detachable to/from the information processing apparatus 10.

The storage device 8 contains a storage medium and stores in the storage medium an OS (Operating System), application software, configuration information, and so on. The storage device 8 can be exemplified by an SSD (Solid State Drive), an HDD (Hard Disk Drive), BD (Blu-ray Disk) drive, a DVD (Digital Versatile Disk) drive, a memory card device, and a flexible disk drive. Moreover, the storage medium can be exemplified by a nonvolatile semiconductor memory (a flash memory), a hard disk, a BD, a DVD, a CD, a memory card, and a flexible disk. The storage medium exemplified above may either be the one that is attachable to and detachable from the storage device 3 or the one that is fixedly installed the storage device 8. Note that the storage medium in this embodiment is a computer-readable medium.

The CPU 1 executes the OS and the BIOS, thereby functioning as a configuration registration unit, a detecting unit, a comparison unit, a boot control unit, change monitoring unit and a dynamic update unit.

The CPU 1 serving as the detecting unit detects configuration information defined as information on the components connected to the information processing apparatus 10 at the time of booting.

The CPU 1 serving as the configuration registration unit stores, as reference configuration information, the information on the components connected to the information processing apparatus 10 into the PCR 63 serving as the configuration storage unit. The configuration registration unit stores the configuration information into the PCR 63 not only at the time of booting but also at the time when the configuration is changed while the OS is in operation.

Figure 2:
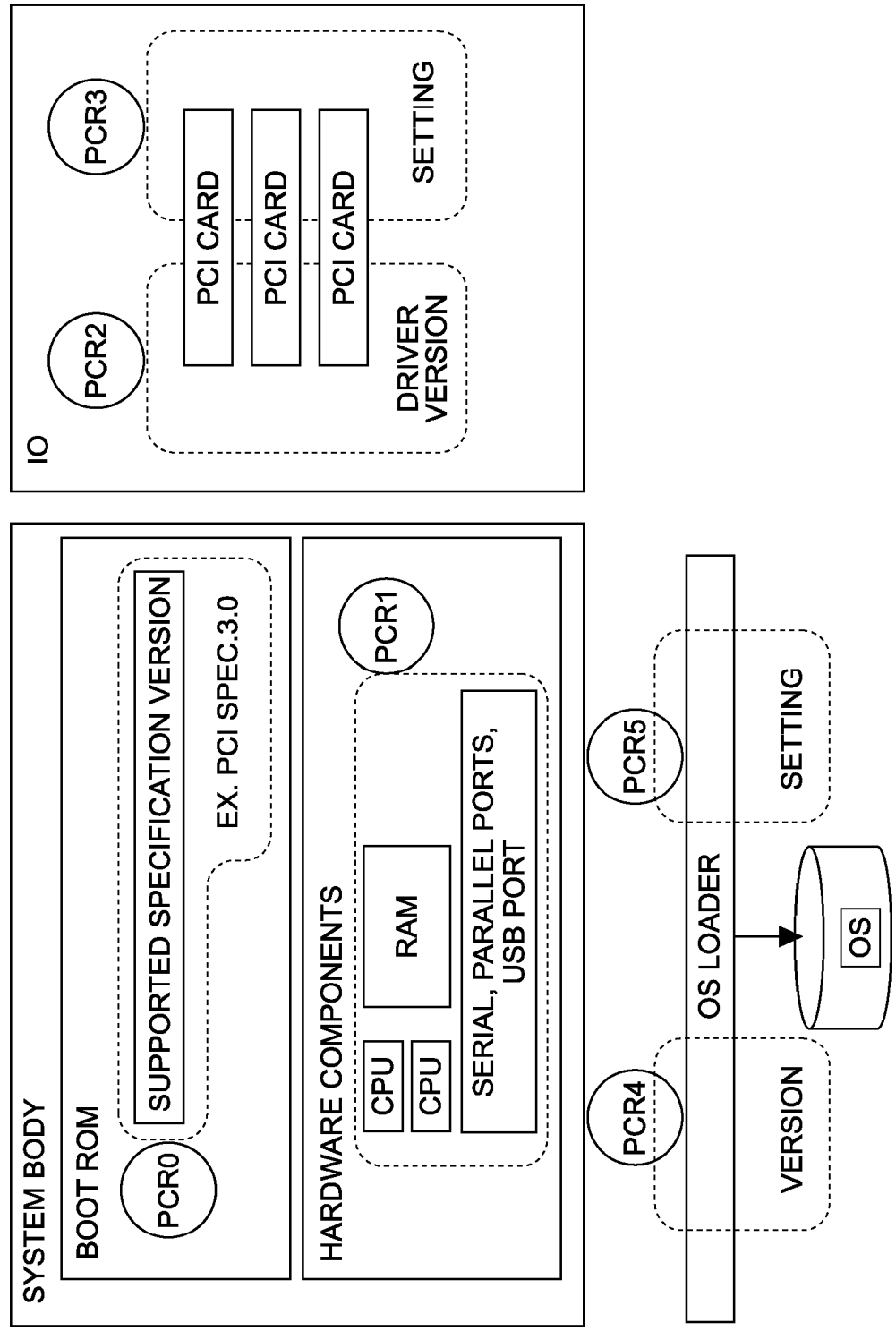
FIG. 2 is an explanatory diagram of configuration information.

FIG. 2 is an explanatory diagram of the configuration information. In this embodiment, specific information is stored in each area of PCR[0]-PCR [5] in the PCR 63.

For instance, the PCR[0] stores information, such as firmware (codes), version of the main body of the information processing apparatus, etc., that is rarely changed at every boot.

The PCR[1] stores setting information of the hardware components such as the CPU, the memory, the universal serial bus port, etc.

The PCR[2] stores firmware code modules, such as driver loaded from the PCI card, application and so on, added for devices except for the main body of the information processing apparatus.

The PCR[3] stores the setting related to the code measured by the PCR[2].

The PCR[4] stores information related to a OS Loader. The OS Loader is a program to start the OS and is practically provided as a component of the OS.

The PCR[5] stores the setting information of the OS Loader, such as a path of the OS boot disk and so on.

The CPU 1 serving as the comparison unit compares the detected configuration information and the reference configuration information when the information processing apparatus 10 is booted.

When an unequal comparison between the detected configuration information and the reference configuration information occurs, the CPU 1 serving as the boot control unit terminates booting of the information processing apparatus 10.

After the booting of the information processing apparatus 10 is completed, the CPU 1 serving as the change monitoring unit monitors configuration changes of the information processing apparatus 10 in operation.

The CPU 1 serving as the dynamic update unit updates, when a configuration change of the information processing apparatus 10 in operation is detected by the monitoring, the reference configuration information with the configuration information of the changed configuration.

In this embodiment, it is possible to increase the number of each of the CPU 1, the RAM 3, the display 4, the device 7 and the storage device 8. Moreover, the CPU 1, controller 2, the RAM 3, the display 4, and storage device 8 can be attached/detached with using the DR.

Figure 3:
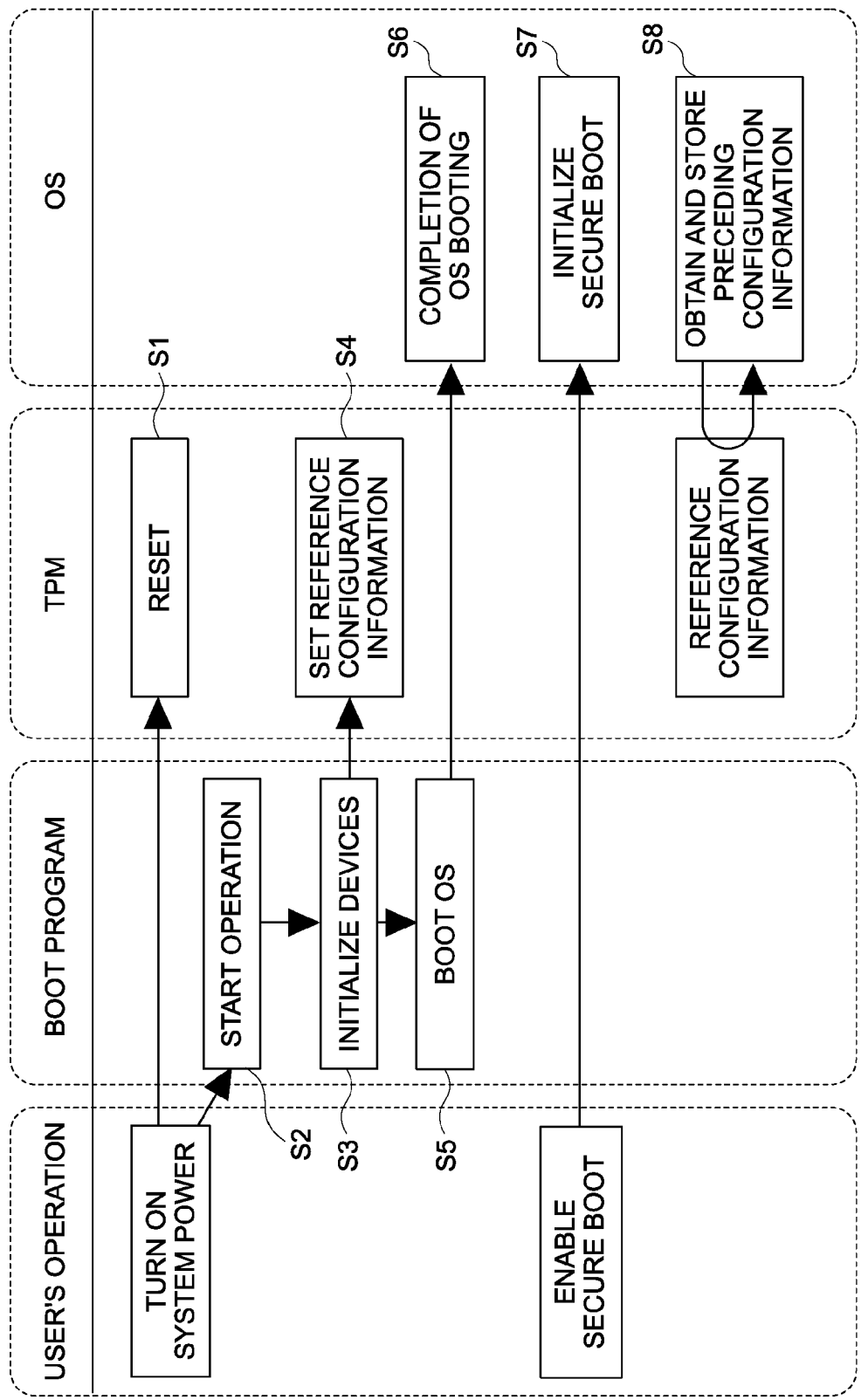
FIG. 3 is an explanatory diagram of a control method in booting for the first time.
Figure 4:
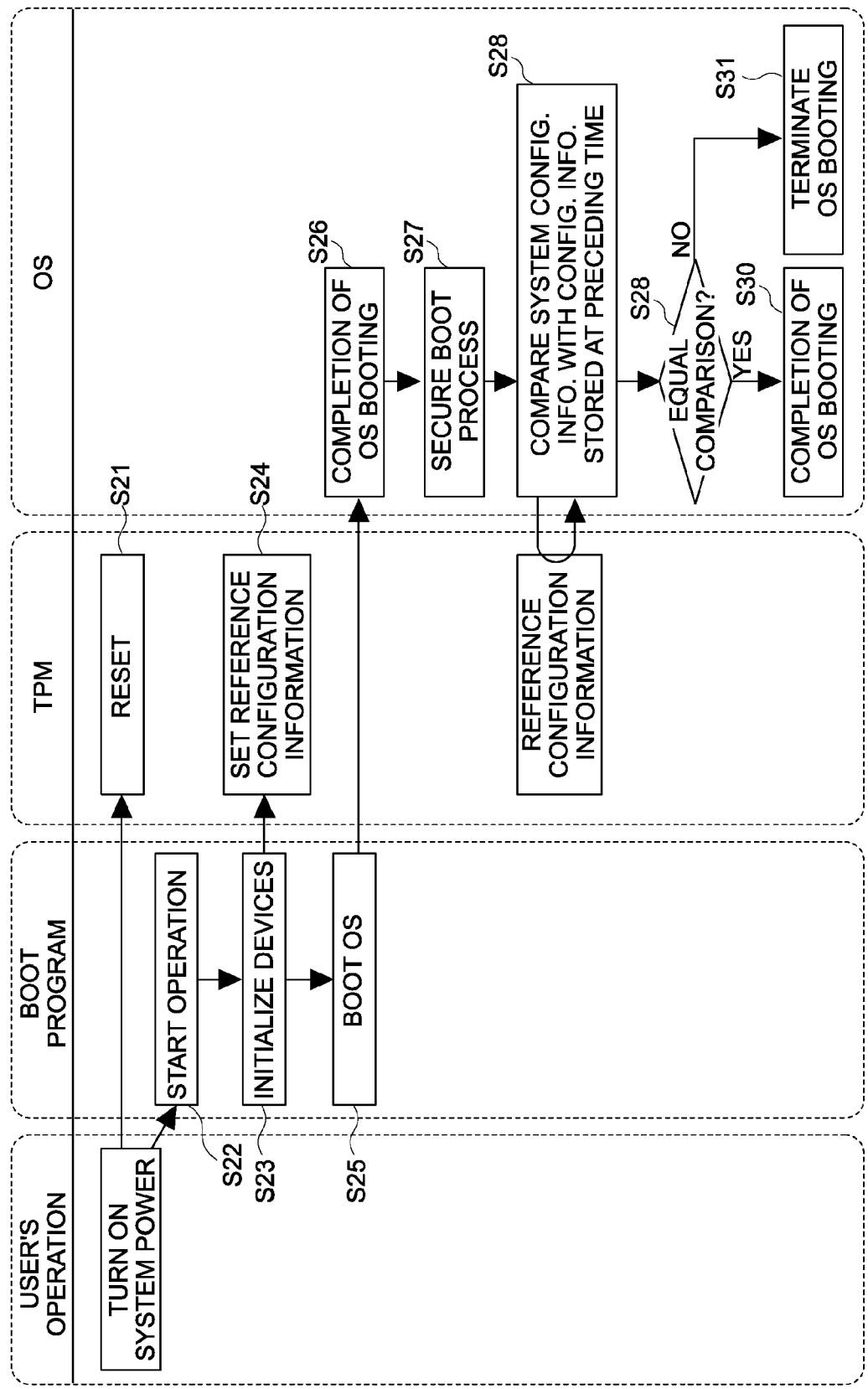
FIG. 4 is an explanatory diagram of a control method in booting for the second and succeeding time.

FIG. 3 through FIG. 5 illustrate control methods that the information processing apparatus having the above-mentioned configuration executes according to a control program. FIG. 3 is an explanatory diagram of a control method in booting for the first time.

First of all, when power of the information processing apparatus is turned on, the external CPU 9 sends the TPM 6 the reset signal, thereby resetting the TPM 6 (S1). Next, the CPU 1 reads and executes the boot program in the boot ROM 5 (S2). Here, the reset signal to the TPM 6 is a signal that notifies the TPM 6 of the start timing, and it is input to a prescribed input terminal of the TPM 6. Incidentally, it is possible that, when the information processing apparatus is turned on, the external CPU 9 performs a control for starting a power supply to the TPM 6 instead of sending the reset signal.

Moreover, the CPU 1 initializes the devices connected with the information processing apparatus 10 according to the boot program, and the CPU 1, as the detecting unit, detects configuration information from the initialized device (S3).

The CPU 1 serving as the configuration registration unit stores the detected configuration information into the PCR 63 in the TPM 6 as the reference configuration information (S4).

Further, the CPU 1, in accordance with the boot program, reads the OS from the storage device 8 to start a boot process (S5), and it makes, when the boot process is completed, the information processing apparatus 10 operate in a status usable by user (S6).

When the user performs operation to enable the secure boot capability through the input device after the booting of the OS is completed, the CPU 1 performs an initialization process of the secure boot capability in accordance with the OS (S7), and it obtains the configuration information from the TPM 6 and stores in the conserved region of the OS as preceding configuration information (S8). Here, enabling the secure boot capability causes that the secure boot becomes effective from when the OS is started at the next time. Note that status whether the secure boot capability is enabled or disabled is stored in the storage device 8 by the CPU 1.

FIG. 4 is an explanatory diagram of a control method in booting for the second and succeeding time.

First of all, when the power of the information processing apparatus is turned on, the external CPU 9 sends the TPM 6 the reset signal to reset the TPM 6 (S21). Subsequently, the CPU 1 reads and executes the boot program in the boot ROM 5 (S22).

Moreover, the CPU 1 initializes the devices connected with the information processing apparatus 10 according to the boot program and then detects, by serving as a detecting unit, the configuration information from the initialized device (S23).

The CPU 1 serving as the configuration registration unit stores the detected configuration information into the PCR 63 of the TPM 6 as the reference configuration information (S24).

Furthermore, the CPU 1, in accordance with the boot program, reads the OS from the storage device 8 to start a boot process (S25), and it makes, when the boot process is completed, the information processing apparatus 10 operate in a status usable by user (S26).

Here, the CPU 1 refers to the storage device 8 and starts the secure boot process if the secure boot capability is enabled (S26). The CPU 1 serving as the comparison unit reads out the reference configuration information from the PCR 63 in the TPM 6, reads out the preceding configuration information from the storage device 8, and compares the reference configuration information and the preceding configuration information (S28).

The CPU 1 serving as the boot control unit, when an equal comparison between reference configuration information and the preceding configuration information occurs (S29, Yes), continues and completes the boot process of the OS (S30). Whereas when an unequal comparison between reference configuration information and the preceding configuration information occurs (S29, No), the CPU 1 terminates the boot process of the OS (S31).

Thus, the OS doesn't start in a case where the reference configuration information and the preceding configuration information are different. Therefore, according to this embodiment, it is possible to prevent the information processing apparatus from being operated in a state where the device not intended is connected.

FIG. 5 is an explanatory diagram of a control method in a case where the configuration is changed with using the DR.

When the user changes the configuration of the information processing apparatus 10 in operation with using the DR after completing of the process of FIG. 3 or FIG. 4, the CPU 1 serving as the change monitoring unit recognizes the configuration change (S41).

When the configuration change of the information processing apparatus 10 in operation by the monitoring, the CPU 1 disables the secure boot capability (S42), and the CPU 1 serving as the comparison unit compares the reference configuration information and the preceding configuration information and ensures that there is no change (S43). When the reference configuration information and the preceding configuration information are different, the CPU 1 suspends processing.

That is, when a device is illegally added or a device is illegally pulled out, processing is suspended at this stage. If a process subsequent to step S48 is performed without taking notice of an illegal configuration change, the reference configuration information will be stored as the preceding configuration information. Therefore, whether the configuration has not changed is verified in advance.

When the equal comparison between the reference configuration information and the preceding configuration information occurs in S43, the CPU 1, in accordance with the OS, executes the change of the configuration with the DR. Namely, the CPU 1 enables the added device or disables the extracted and removed device (S44). Depending on the DR process of the OS, the process in S44 might be performed within or after the processes in S45, S46 and S47 described later.

The CPU 1 sends the reset request to the external CPU 9, thereby resetting the TPM 6 (S45).

The CPU 1 serving as the detecting unit re-detects devices connected with the information processing apparatus 10 (S46). The CPU 1 serving as the configuration registration unit registers re-defected configuration information in the PCR 63 as the reference configuration information (S47).

Subsequently, the CPU 1 enables the secure boot capability (S48) and starts the initialization process of the secure boot capability (S49). The CPU 1 serving as the dynamic update unit obtains the configuration information from the TPM 6, and stores the obtained configuration information in as the preceding configuration information into the preserved area of the OS within the storage device 8 (S50).

As discussed above, according to this embodiment, when the configuration change of the information processing apparatus in operation is made, the reference configuration information is immediately updated so as to be a consistent state with the preceding configuration information, which causes that the booting process is not terminated at the next booting.

Moreover, according to the embodiment, if the configuration change is made while the information processing apparatus is in operation, next booting is performed in a status where the secure boot is enabled. Therefore, the information processing apparatus according to the embodiment can be booted without degrading the security level even after the configuration has been changed.

The present invention is not limited to only the illustrated examples given above but can be, as a matter of course, changed in a variety of forms within the scope that does not deviate from the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a configuration storage unit to store information on components having been connected to the information processing apparatus as reference configuration information;
a detecting unit to detect configuration information on components being connected to the information processing apparatus in booting;
a comparing unit to compare the detected configuration information and the reference configuration information in an enabling status of secure boot capability when the information processing apparatus is booted;
a boot control unit to terminate booting of the information processing apparatus when an unequal comparison between the detected configuration information and the reference configuration information occurs;
a monitoring unit to monitor, after the information processing apparatus is booted, a configuration change of the information processing apparatus that is in operation; and
a dynamic update unit to update, when the configuration change of the information processing apparatus in the operation is recognized by the monitoring unit, the reference configuration information with configuration information of the information processing apparatus a configuration of which has been changed, in a disabling status of the secure boot capability,
wherein when the configuration change of the information processing apparatus in the operation is recognized by the monitoring unit, the comparing unit compares, before the reference configuration information is updated, the configuration information of the information processing apparatus the configuration of which has been changed and the reference configuration information in the disabling status of the secure boot capability, and when an equal comparison between the configuration information of the information processing apparatus the configuration of which has been changed and the reference configuration information occurs, the disabling status of the secure boot capability is changed to the enabling status of the secure boot capability after an updating process by the dynamic update unit is executed, and
wherein when the configuration change of the information processing apparatus in the operation is recognized by the monitoring unit, the comparing unit compares, before the reference configuration information is updated, the configuration information of the information processing apparatus the configuration of which has been changed and the reference configuration information in the disabling status of the secure boot capability, when an unequal comparison between the configuration information of the information processing apparatus the configuration of which has been changed and the reference configuration information occurs, the updating process by the dynamic update unit is terminated while keeping the information processing apparatus in a running state, and the disabling status of the secure boot capability is changed to the enabling status of the secure boot capability after the information processing apparatus is rebooted.

2. A method executed by an information processing apparatus, the method comprising:
storing in a configuration storage unit information on components having been connected to the information processing apparatus as reference configuration information;
detecting configuration information on components being connected to the information processing apparatus in booting;
comparing the detected configuration information and the reference configuration information in an enabling status of secure boot capability when the information processing apparatus is booted;
terminating booting of the information processing apparatus when an unequal comparison between the detected configuration information and the reference configuration information occurs;
monitoring, after the information processing apparatus is booted, a configuration change of the information processing apparatus in operation; and
updating, when the configuration change of the information processing apparatus in the operation is recognized by the monitoring, the reference configuration information with configuration information of the information processing apparatus a configuration of which has been changed, in a disabling status of the secure boot capability,
wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, and when an equal comparison between the configuration information of the information processing apparatus the configuration of which has been changed and the reference configuration information occurs, the disabling status of the secure boot capability is changed to the enabling status of the secure boot capability after an updating process by the updating is executed, and
wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, when an unequal comparison between the configuration information of the information processing apparatus the configuration of which has been changed and the reference configuration information occurs, the updating process by the updating is terminated while keeping the information processing apparatus in a running state, and the disabling status of the secure boot capability is changed to the enabling status of the secure boot capability after the information processing apparatus is rebooted.

3. A non-transitory machine-readable storage medium stored with a control program that makes an information processing apparatus execute;
storing in a configuration storage unit information on components having been connected to the information processing apparatus as reference configuration information;
detecting configuration information on components being connected to the information processing apparatus in booting;

comparing the detected configuration information and the reference configuration information in an enabling status of secure boot capability when the information processing apparatus is booted;

terminating booting of the information processing apparatus when an unequal comparison between the detected configuration information and the reference configuration information occurs;

monitoring, after the information processing apparatus is booted, a configuration change of the information processing apparatus in operation; and updating, when the configuration change of the information processing apparatus in the operation is recognized by the monitoring, the reference configuration information with configuration information of the information processing apparatus a configuration of which has been changed, in a disabling status of the secure boot capability, wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, and when an equal comparison between the configuration information of the information processing apparatus the configuration of which has been changed and the reference configuration information occurs, the disabling status of the secure boot capability is changed to the enabling status of the secure boot capability after an updating process by the updating is executed, and wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, when an unequal comparison between the configuration information of the information processing apparatus the configuration of which has been changed and the reference configuration information occurs, the updating process by the updating is terminated while keeping the information processing apparatus in a running state, and the disabling status of the secure boot capability is changed to the enabling status of the secure boot capability after the information processing apparatus is rebooted.

4. An information processing apparatus comprising:

a configuration register to store information on components having been connected to the information processing apparatus as reference configuration information; and a processor to execute:

detecting configuration information on components being connected to the information processing apparatus in booting;

comparing the detected configuration information and the reference configuration information in an enabling status of secure boot capability when the information processing apparatus is booted;

terminating booting of the information processing apparatus when an unequal comparison between the detected configuration information and the reference configuration information occurs;

monitoring, after the information processing apparatus is booted, a configuration change of the information processing apparatus that is in operation; and updating, when the configuration change of the information processing apparatus in the operation is recognized by the monitoring, the reference configuration information with configuration information of the information processing apparatus a configuration of which has been changed, in a disabling status of the secure boot capability, wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, and when an equal comparison between the configuration information of the information processing apparatus the configuration of which has been changed and the reference configuration information occurs, the disabling status of the secure boot capability is changed to the enabling status of the secure boot capability after an updating process by the updating is executed, and wherein when the configuration change of the information processing apparatus in the operation is recognized by the monitoring, the comparing compares, before the reference configuration information is updated, the configuration information of the information processing apparatus the configuration of which has been changed and the reference configuration information in the disabling status of the secure boot capability, when an unequal comparison between the configuration information of the information processing apparatus the configuration of which has been changed and the reference configuration information occurs, the updating process by the updating is terminated while keeping the information processing apparatus in a running state, and the disabling status of the secure boot capability is changed to the enabling status of the secure boot capability after the information processing apparatus is rebooted.

* * * * *